April 18, 1944.   E. G. ORAVEC   2,346,938
VALVE
Filed April 25, 1942

Inventor:
Emil G. Oravec,
By: Joseph O. Lange
Atty.

Patented Apr. 18, 1944

2,346,938

UNITED STATES PATENT OFFICE 2,346,938

VALVE

Emil G. Oravec, Chicago, Ill., assignor to Crane Co., Chicago, Ill., a corporation of Illinois Application April 25, 1942, Serial No. 440,523

5 Claims. (Cl. 251—27)

This invention relates to a new and improved valve and has for one of its principal objects the provision of a novel valve possessing quiet flow characteristics.

An important object of this invention is to provide a quiet flow valve constructed so as to minimize the objectionable effects of cavitation and embody a construction promoting smooth, continuous quiet flow of fluid therethrough.

Another important feature of the valve of this invention is the provision of a substantially flat disc construction having in cooperation therewith a central depression or recess. An inwardly inclined seat is preferably provided which provides a converging flow of fluid at the valve seat, such flow being one of the significant factors which tend to minimize flow noise.

Figure 1:
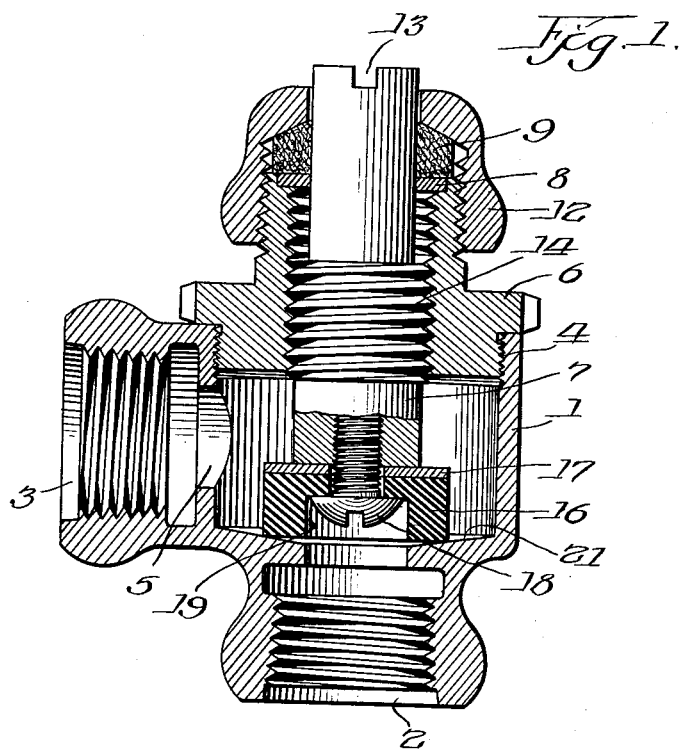

Other and further important objects will become apparent from the disclosures in the accompanying drawing and following specification in connection with the drawing, in which Fig. 1 is a longitudinal sectional assembly view of the quiet flow valve embodying the invention.

Figure 2:
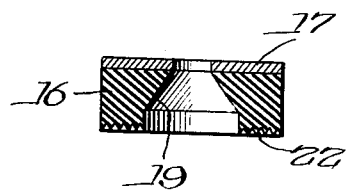

Fig. 2 shows a modified form of disc or closure member to be used in connection with the valve shown in Fig. 1.

As shown in Fig. 1, the reference numeral 1 indicates generally the valve body having the respective inlet and outlet ports 2 and 3. A third opening, as indicated by the thread 4, at the top thereof provides for the connection with the bonnet 6. The valve stem 7 projects upwardly through the bonnet 6 and is surrounded by a washer 8 at the upper end of the bonnet 6. The packing 9 is compressed around the stem supported by the washer 8 being held in place by the cap or stuffing nut 12. The stem is preferably, but not necessarily, rotated by means of the screw-driver slot 13 and gains reciprocating action by means of the enlarged integral threaded hub portion 14 on the stem engaging the similar internal threads provided in the bonnet 6. The lower end of the stem is equipped with a disc 16 usually of rubber, composition, or similar material. A washer 17 serves to back up or stiffen the disc with the screw 18 serving to hold the disc and the washer in position on the stem 7. The disc 16 is further provided with a central recess 19 permitting the screw head 18 to be contained therein, and also allowing for improved valve performance, as hereinafter explained in greater detail.

The valve body 1 is provided with the inwardly inclined seat 21 which is preferably arranged so that three is a smooth, substantially unbroken surface between the seat opening and the interior wall of the valve body 1. The outlet orifice 5 is preferably designed to provide for slight back pressure necessary to prevent cavitation in the valve chamber above the seat and yet avoid appreciable retardation of the line flow.

Desirable converging flow of fluid through the valve is obtained by employment of the inclined seat and the cooperating flat disc thereon. The cylindrical surface area directly above the inlet and defining the interior chamber limits of the body 1 will be greater for a predetermined lift of the valve disc than the cylindrical surface area formed by the outer periphery of the disc, depending upon the degree of inclination of the valve seat 21. The area provided above the inlet circumference will begin at a positive figure, whereas the area formed by the outer periphery of the valve closure member will begin at zero inasmuch as there is no exposed area as such between the closed members. However, as the valve is opened, the closure member outer peripheral area will increase at a much greater rate than the area provided above the inlet circumference and up to the point where the two areas are the same, the area of the channel is decreasing and beyond that point, the area of the channel is increasing. It is preferable therefore to determine the maximum flow rate at which the valve is to be employed and thereupon incline the seat 21 at such an angle that any lower rate of flow through the valve will be well within the limit of convergent flow as determined by the disc lift. Under similar conditions of velocity of the fluid, temperature, viscosity, and the like, converging flow of fluid has been found to be more quiet than diverging flow of fluid.

As previously stated, the recess 19 in the central portion of the disc which receives the screw head 18 also reduces the amount of turbulence and cavitation ordinarily caused by a projecting screw head and to some degree of even a flat continuous surface disc.

In some cases it has been found that a serrated or roughened surface on disc structure performs advantageously, and in Fig. 2 a modified form of disc is shown having serrations 22 on the lower face thereof which provide quiet flow characteristics. These serrations may be either spiral or concentric in their arrangement, as desired, or else the surface may be merely roughened, say by knurling or the like.

Therefore it is apparent that numerous details of construction may be varied throughout a wide range without departing from the principles disclosed herein, and I therefore do not propose limiting the claims granted hereon otherwise than as necessitated by the prior art.

I claim:

1. A quiet flow valve comprising a body having an inlet, an outlet, and a restricted outlet orifice therebetween, an inwardly inclined seat above the said inlet inclined slightly from the horizontal plane, the said inclined seat extending continuous and unbroken to an internal curved body wall defining a substantially closed cylindrical chamber within the body except for that portion forming the said restricted outlet orifice, a closure member substantially larger than the inlet seat opening of the valve body and having a central recessed portion positioned over the inlet seat opening, the contact surface of the said closure member extending in a substantially horizontal plane whereby the said closure member makes contact at its outer periphery with the inclined seat to direct line flow radially outwardly and upwardly against the curved wall of the cylindrical chamber.

2. A quiet flow valve comprising a body having an inlet aperture, an outlet, and a restricted outlet orifice therebetween having sharp corners defining its inner perimetral limits, an inwardly inclined seat above said inlet inclined slightly from the horizontal plane and extending in an unbroken annular surface to the internal body wall defining a chamber within said body having sharp corners at its upper and lower perimetral limits, a closure member relatively larger than the inlet aperture and having a flat surface adapted to engage an annular portion of the inclined seat, the said closure member having a recessed portion of a size substantially not less than that of the body inlet aperture, whereby cavitational tendencies of line flow immediately adjacent the said closure member are inhibited.

3. A quiet flow valve comprising a body having an inwardly inclined seat inclined slightly from a horizontal plane and extending continuous to a substantially cylindrical wall defining the inner body limits, the said body having an inlet aperture in communication with the said inclined seat and having a restricted outlet orifice transversely positioned in the body wall above the said seat, a reciprocably movable plain faced closure member for seating contact with the said seat, the said closure member having a lower centrally positioned recess therewithin, the latter recess forming a chamber to receive and to deflect a portion of the flow past the said seat, the diameter of the said closure member being substantially larger than the diameter of the inlet aperture adjacent the valve seat whereby a substantial part of the fluid flow through the said inlet aperture is made to converge and to move upwardly along a curved surface portion of the body wall upon predetermined lift of the said closure member.

4. A quiet flow valve having an inlet, an outlet, and a restricted outlet orifice therebetween, actuating means for the valve, a seat in said body between said inlet and outlet slightly inclined inwardly from the horizontal plane, a reciprocably movable closure member with an annular serrated face extending in a substantially horizontal plane adapted to engage an outer annular portion of the inclined seat, the diameter of the closure member being substantially larger than the body seat opening, the said closure member having a centrally recessed portion, means substantially contained within said recessed portion for attaching said closure member to the said actuating means.

5. A quiet flow valve of the character described comprising a body having an inwardly inclined seat slightly inclined from the horizontal plane and extending substantially continuous to the annular body wall providing a valve chamber, the juncture between the outside limits of the said seat and the said wall being defined by a sharp corner, the said body having an inlet passage communicating with the said seat and a restricted outlet orifice in the body wall above the said seat to form the outlet for the valve chamber, a resilient closure member reciprocably movable relative to the said inclined seat, the said closure member having a substantially flat annular surface interrupted by a centrally positioned depression, the peripheral span of the said closure member being substantially greater than the diameter of the inlet seat opening whereby fluid flow through the valve converges up to a predetermined lift of the said closure member, the said latter member being roughened on its flat annular surface portion.

EMIL G. ORAVEC.